(12) United States Patent
Kabrick et al.

(10) Patent No.: US 9,410,598 B2
(45) Date of Patent: Aug. 9, 2016

(54) DRIVE ASSEMBLY FOR MACHINE

(71) Applicant: Caterpillar Inc., Peoria, IL (US)

(72) Inventors: Keith A. Kabrick, Springfield, IL (US); Christopher P. Braet, Washington, IL (US); Trent Thum, Wexford, PA (US); Brandon Mann, Monticello, IL (US); Vanyo N. Kirov, Milwaukee, WI (US); Timothy S. Stoakes, Naperville, IL (US); Brian C. Boguski, Edwards, IL (US); Daniel J. Reed, Brimfield, IL (US); Timothy F. Nusz, Wyoming, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/715,624

(22) Filed: May 19, 2015

(65) Prior Publication Data

US 2015/0252875 A1    Sep. 10, 2015

(51) Int. Cl.
| | |
|---|---|
| F16H 57/12 | (2006.01) |
| F16H 1/28 | (2006.01) |
| F16H 1/32 | (2006.01) |
| F16H 3/44 | (2006.01) |
| F16H 57/08 | (2006.01) |

(52) U.S. Cl.
CPC ............. *F16H 1/28* (2013.01); *F16H 57/12* (2013.01); *F16H 2001/326* (2013.01); *F16H 2003/442* (2013.01); *F16H 2057/085* (2013.01); *F16H 2057/126* (2013.01); *F16H 2057/127* (2013.01)

(58) Field of Classification Search
None
See application file for complete search history.

(56) References Cited

U.S. PATENT DOCUMENTS

| 2,939,558 | A | * | 6/1960 | Schjolin | F16D 25/0638 |
|---|---|---|---|---|---|
| | | | | | 192/106 F |
| 2,963,923 | A | | 12/1960 | Kelley et al. | |
| 3,905,661 | A | * | 9/1975 | Orr | F16C 19/54 |
| | | | | | 180/9.62 |
| 3,969,950 | A | | 7/1976 | Rau et al. | |
| 4,082,299 | A | | 4/1978 | Sly et al. | |
| 4,166,659 | A | | 9/1979 | Gleichman | |
| 5,480,361 | A | | 1/1996 | Murakami et al. | |
| 7,748,499 | B2 | | 7/2010 | Selever et al. | |
| 8,376,627 | B2 | | 2/2013 | Oakley et al. | |

FOREIGN PATENT DOCUMENTS

| DE | 19852394 | 5/2000 |
|---|---|---|
| EP | 0823346 | 2/1998 |

\* cited by examiner

*Primary Examiner* — Justin Holmes

(57) ABSTRACT

A final drive assembly for a machine includes an input shaft drivably coupled to a prime mover. The input shaft is coupled to and drives a first stage gear assembly. The first stage gear assembly further drives a second stage gear assembly. The first and second stage gear assemblies drive a ring gear which is coupled to a wheel of the machine. The first and second stage gear assemblies are disposed between a first bearing assembly and a second bearing assembly. A spring member preloads the first bearing assembly to limit an axial movement of the first and second stage gear assemblies.

1 Claim, 5 Drawing Sheets

DRIVE ASSEMBLY FOR MACHINE

TECHNICAL FIELD

The present disclosures relates to a drive assembly, and in particular, to a final drive assembly for a machine.

BACKGROUND

A machine, such as off-highway trucks, includes at least one pair of driven ground engaging members (for example, wheels) for propulsion, and braking or retardation. A final drive assembly drives each wheel. The final assembly is typically a two stage planetary gear arrangement.

During operation, the two stage planetary gear arrangement may undergo axial and radial movements. Such axial and radial movements may cause tilting misalignment between gears of the two stages. The tilting misalignment may damage gear teeth and cause premature failure of the final drive assembly.

For reference, U.S. Pat. No. 2,963,923 (the '923 patent) discloses an engine accessory drive including a drive shaft and a driven shaft, a planetary gear set including a first element connected to the drive shaft, a second element connected to the driven shaft, and a third element adapted to provide reaction in the gear set for establishing torque transmitting drive between the shafts. The engine accessory drive of the '923 patent also includes a stationary ground member and a resilient means for normally urging the third element into frictional engagement with the ground member with a predetermined force to resist rotation of the third element and thereby provide torque reaction for the gearing. However, the urging of the resilient means may not prevent any undesired axial and radial movements of various components of the gear set during operation.

SUMMARY OF THE DISCLOSURE

In an aspect of the present disclosure, a final drive assembly for a machine is provided. The final drive assembly has an outboard end. The final drive assembly includes an input shaft drivably coupled to a prime mover of the machine. The input shaft defines a longitudinal axis therethrough. The final drive assembly further includes a first stage gear assembly driven by the input shaft. The first stage gear assembly includes a first sun gear, a plurality of first planet gears and a first carrier. The first sun gear is coupled to and driven by the input shaft. Each of the plurality of first planet gears is drivably engaged with the first sun gear. The first carrier is rotatably coupled to each of the plurality of first planet gears. Further, the first carrier is disposed adjacent to the outboard end of the final drive assembly.

The final drive assembly further includes a second stage gear assembly driven by the first stage gear assembly. The second stage gear assembly includes a second sun gear, a plurality of second planet gears and a second carrier. The second sun gear is coupled to and driven by the first carrier of the first stage gear assembly. Each of the plurality of second planet gears is drivably engaged with the second sun gear. The second carrier is coupled to each of the plurality of second planet gears. Further, the second carrier is coupled with a hub member.

The final drive assembly also includes a ring gear. The ring gear is drivably engaged with each of the plurality of first planet gears and each of the plurality of second planet gears. The ring gear is further coupled to a wheel of the machine. The final drive assembly includes a cover coupled to the ring gear. The cover is further disposed at the outboard end of the final drive assembly. The final drive assembly includes a first bearing assembly disposed adjacent to the first carrier. Further, the first bearing assembly is configured to rotatably support the first carrier. A spring member is disposed between the first bearing assembly and the cover.

The final drive assembly includes a sleeve and a second bearing assembly. The sleeve is received at least partly within the second sun gear. The second bearing assembly is disposed adjacent to the sleeve. The second bearing assembly is configured to rotatably support the second sun gear. Further, the spring member is configured to bias the first bearing assembly, the first carrier and the second sun gear towards the second bearing assembly to limit a movement of each of the first stage gear assembly and the second stage gear assembly along the longitudinal axis.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
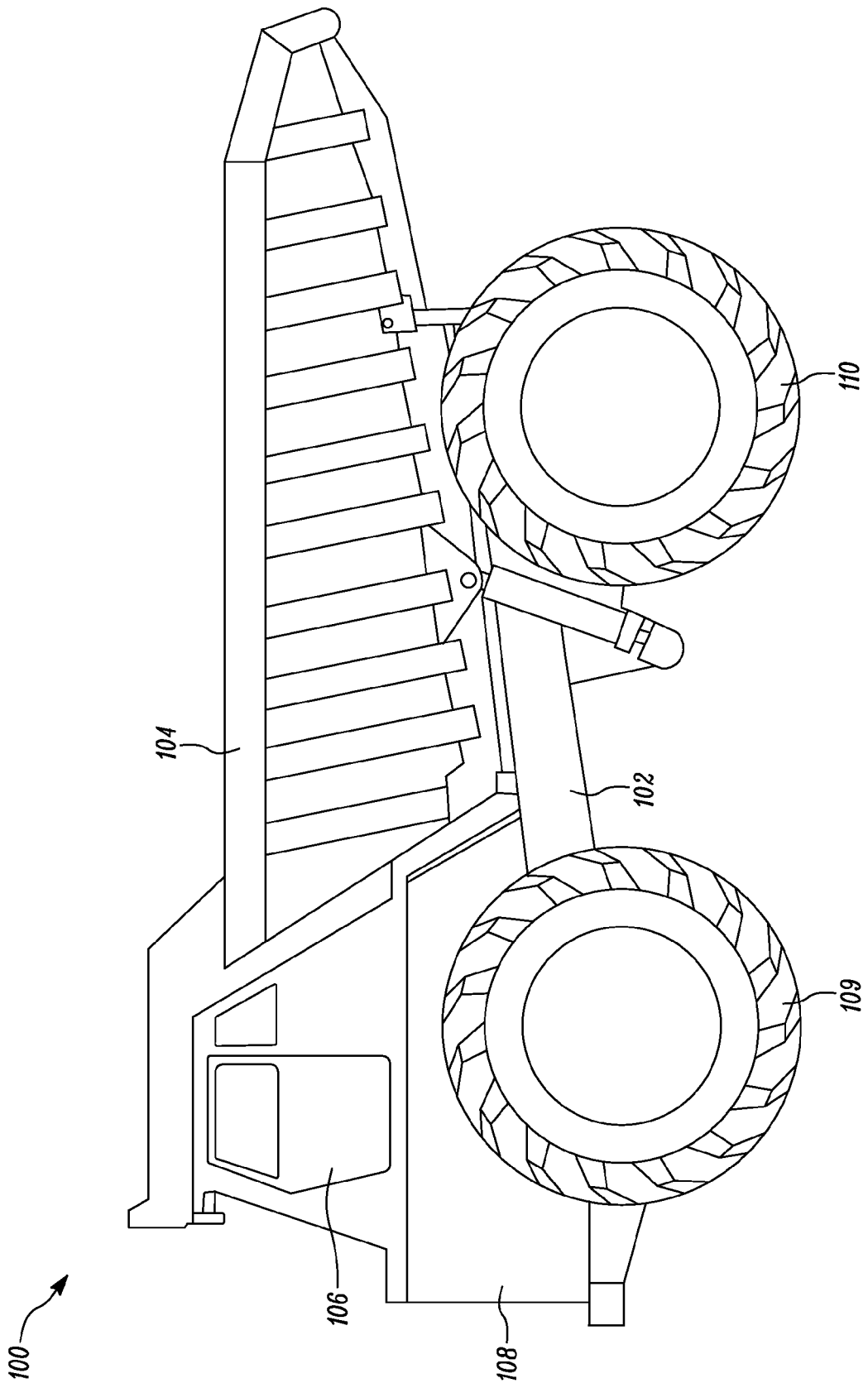
FIG. 1 is a side view of an exemplary machine.

FIG. 1 shows a side view of an exemplary machine 100. In the illustrated embodiment, the machine 100 is an off-highway truck. Alternatively, the machine 100 may be any machine including, but not limited to, a wheel loader, a shovel, a backhoe loader, a dozer, a wheel excavator, and the like. Further, the present disclosure may be applied to different types of machines used in industries including, but not limited to, earth-moving, construction, transportation, agriculture, forestry, and waste management.

The machine 100 comprises a frame 102 and a material carrying dump body 104 pivotally mounted to the frame 102. An operator cab 106 is mounted on the front of the frame 102 above an engine enclosure 108. The machine 100 is supported on the ground by a pair of front wheels 109 (one shown), and a pair of driven rear wheels 110 (one shown). Further, the machine 100 is powered by a prime mover (not shown). Further, the prime mover is housed within the engine enclosure 108. The prime mover may be an engine, such as an internal combustion engine which runs on diesel, gasoline, gaseous fuels, or a combination thereof. The engine may be of various configurations, such as in-line, V-type etc. Further, the engine drives an electric generator which in turn powers electric drive motors (not shown) that generates the driving torque necessary for propelling the machine 100. In an embodiment, a pair of electric drive motors is provided for driving the pair of rear wheels 110. Further, the torque from each of the electric drive motors is transmitted to an input shaft 206 (shown in FIG. 2). The input shaft 206 drives each of the rear wheels 110 by means of a final drive assembly 200.

Figure 2:
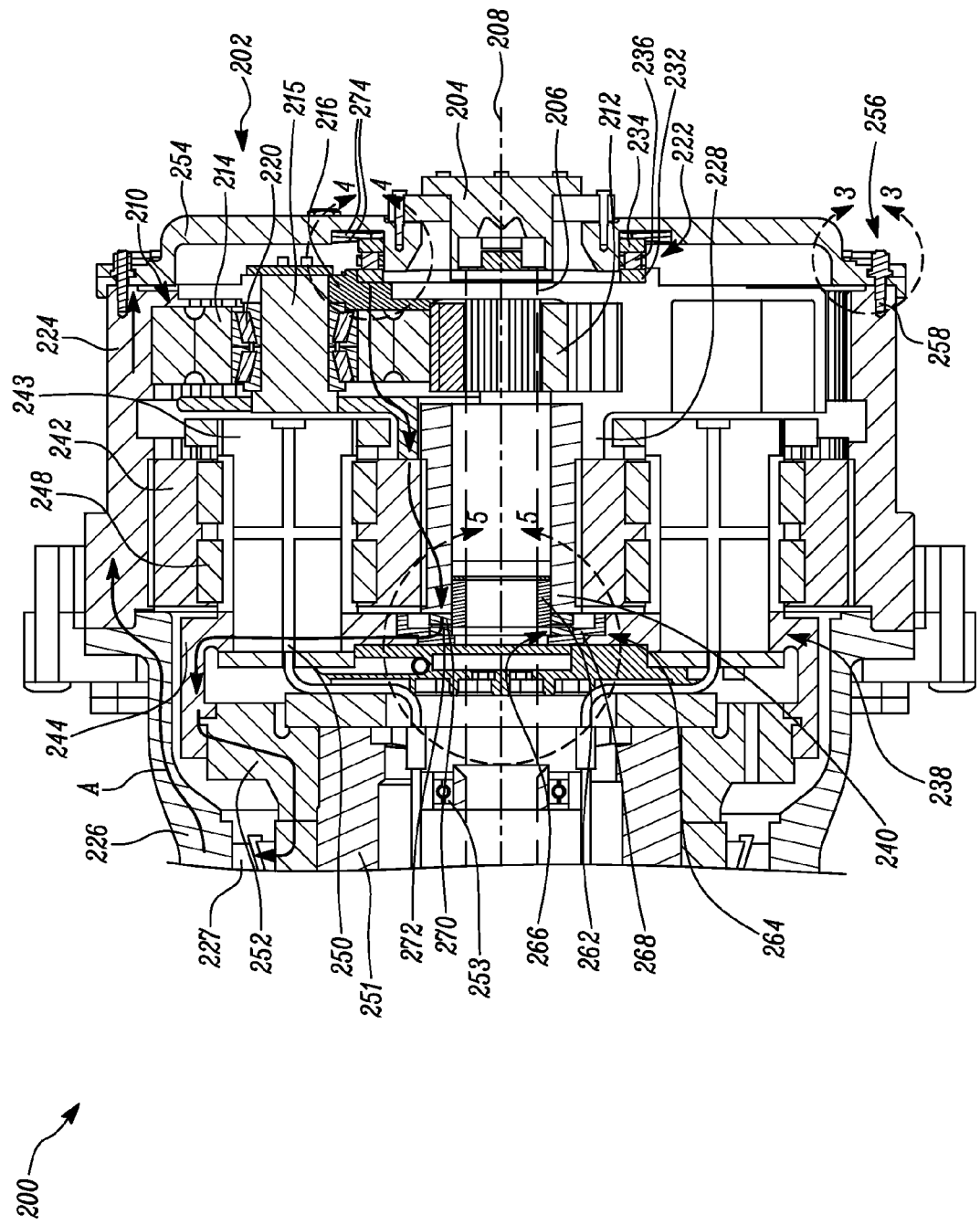
FIG. 2 is a sectional view of a final drive assembly of the machine, according to an embodiment of the present disclosure.

FIG. 2 is a sectional view of the final drive assembly 200 of the machine 100. The final drive assembly 200 has an outboard end 202. The final drive assembly 200 receives input power from an input shaft 206 (shown by dotted lines). The input shaft 206 is drivably coupled to the corresponding electric drive motor at an end distal to the outboard end 202. Further, a bearing member 253 rotatably supports the input shaft 206 within a spindle member 251. The input shaft 206 also defines a longitudinal axis 208 through the center of the input shaft 206. The input shaft 206 further drives a first stage gear assembly 210 of the final drive assembly 200.

The first stage gear assembly 210 includes a first sun gear 212. The first sun gear 212 is coupled to the input shaft 206. In the illustrated embodiment, the input shaft 206 is coupled to the first sun gear 212 via a splined connection. Further, the first sun gear 212 is driven by the input shaft 206 when the power from the prime mover is transmitted to the input shaft 206 via the electric drive motor. The first stage gear assembly 210 includes a plurality of first planet gears 214. The number of first planet gears 214 may be three or more. The first sun gear 212 and each of the first planet gears 214 are axially disposed parallel to the longitudinal axis 208. Further, each of the first planet gears 214 is equi-angularly spaced about the longitudinal axis 208. The first planet gears 214 are drivably engaged with the first sun gear 212. In the present embodiment, the first sun gear 212 and the first planet gears 214 are spur gears. In an alternate embodiment the first sun gear 212 and the first planet gears 214 may be helical gears, center-relieved double-helical gears, and the like. Further, the first planet gears 214 are rotatably coupled to a first carrier 216. The first carrier 216 includes a set of mounting pins 215 that couples each of the first planet gears 214 to the first carrier 216. Further, a tapered roller bearing 220 rotatably supports each of the first planet gears 214 with respect to the mounting pins 215. The mounting pins 215 enable the first carrier 216 and the first planet gears 214 to revolve together with respect to the first sun gear 212.

The final drive assembly 200 includes a ring gear 224. The ring gear 224 includes multiple teeth (not shown) disposed on an inner surface. The ring gear 224 is coupled to the first planet gears 214 such that the first planet gears 214 transmit power to the ring gear 224. Specifically, the first planet gears 214 rotate over the ring gear 224 during operation. The ring gear 224 is further coupled to a wheel housing 226 of the machine 100. A wheel bearing 227 is disposed between the wheel housing 226 and a hub member 252. The wheel housing 226 may be adapted to support one or more wheel rims (not shown) thereon.

Further, the first carrier 216 includes a cylindrical portion 228 extending along the longitudinal axis 208 distal to the outboard end 202. The cylindrical portion 228 may include splines (not shown) disposed on an inner surface thereof.

Figure 3:
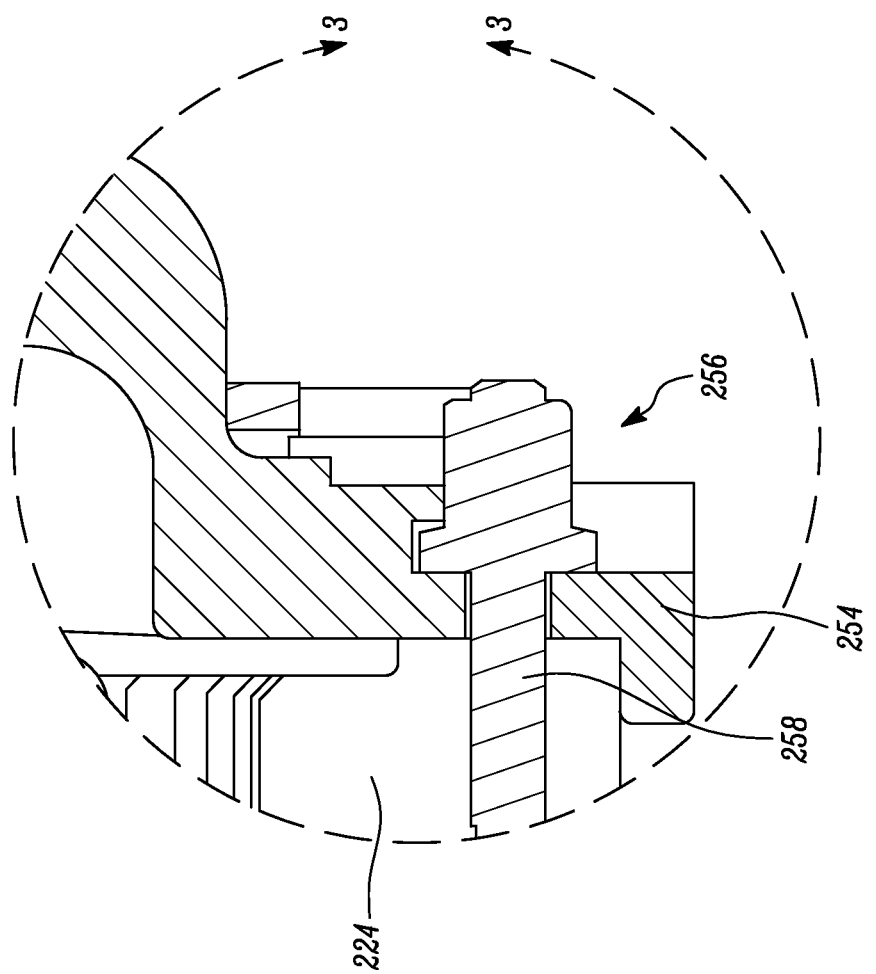
FIG. 3 is an enlarged view of the encircled portion 3-3 of FIG. 2.

Referring to FIGS. 2 and 3, the final drive assembly 200 includes the cover 254 coupled to the ring gear 224. The cover 254 is disposed at the outboard end 202 of the final drive assembly 200. The cover 254 is coupled to the ring gear 224 by means of fasteners 256. In the illustrated embodiment, the fasteners 256 are stud and nut assemblies. The final drive assembly 200 includes an axle retaining member 204 at the outboard end 202. The axle retaining member 204 is disposed in an opening of the cover 254. The axle retaining member 204 may be coupled to the cover 254 and adapted to encase various components of the final drive assembly 200.

Figure 4:
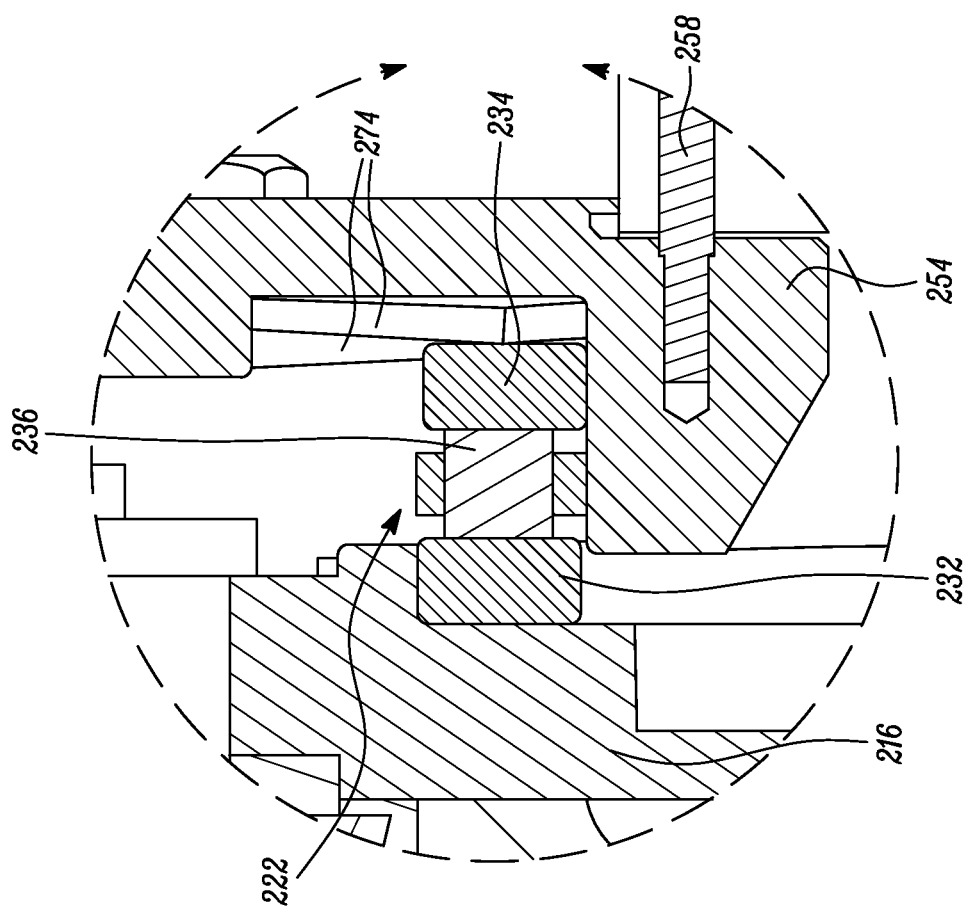
FIG. 4 is an enlarged view of the encircled portion 4-4 of FIG. 2.

Referring to FIGS. 2 and 4, a first bearing assembly 222 is disposed adjacent to the first carrier 216. In the illustrated embodiment, the first bearing assembly 222 is an outboard bearing assembly. Further, the first bearing assembly 222 is configured to rotatably support the first carrier 216. Specifically, the first bearing assembly 222 may allow relative rotation between the first carrier 216 and the cover 254. The first bearing assembly 222 includes an inboard race 232, an outboard race 234 and rolling elements 236 disposed between the inboard race 232 and the outboard race 234. The inboard race 232 of the first bearing assembly 222 is disposed on the first carrier 216. The outboard race 234 is disposed on the cover 254. In the present embodiment, the rolling elements 236 of the first bearing assembly 222 are cylindrical roller. However, in alternate embodiments, the rolling elements 236 may be balls, tapered rollers and the like. Further, it may also be contemplated that the bearing assembly may be a plain bearing.

Referring to FIG. 4, the final drive assembly 200 includes one or more spring members 274. The spring members 274 are disposed between the first bearing assembly 222 and the cover 254. In the illustrated embodiment, the spring members 274 are belleville springs. In an alternate embodiment, the spring member 274 may be a compression spring, and the like. Further, the spring member 274 is configured to bias the first bearing assembly 222, the first carrier 216 and the second sun gear 240 towards a second bearing assembly 264.

Referring to FIG. 2, the first stage gear assembly 210 further drives a second stage gear assembly 238. The second stage gear assembly 238 includes a second sun gear 240. The second sun gear 240 is coupled to and driven by the first carrier 216. The splines of the cylindrical portion 228 may be engaged with corresponding portions of the second sun gear 240 such that the second sun gear 240 rotates with the first carrier 216. The second stage gear assembly 238 further includes a plurality of second planet gears 242. The second planet gears 242 are drivably engaged with the second sun gear 240. The second planet gears 242 may include four identical gears disposed parallel to the longitudinal axis 208. Further, the second planet gears 242 are spaced equi-angularly about the longitudinal axis 208.

Further, the second planet gears 242 are coupled to a second carrier 244, such that the relative spacing between each of the second planet gears 242 may remain same. Mounting pins 243 and a roller bearing 248 support each of the second planet gears 242 on the second carrier 244. Further, the mounting pins 243 define passages 250 to allow lubricant to flow to the roller bearing 248 for smooth rotation of the second planet gears 242. Further, the second carrier 244 is coupled with the hub member 252. In an embodiment, the hub member 252 and the second carrier 244 may be coupled to each other by a splined connection, a bolted joint and the like. Further, the spindle member 251 is connected to the hub member 252. The ring gear 224 is drivably engaged with each of the first planet gears 214 and each of the second planet gears 242. Further, the ring gear 224 drives the wheel housing 226. The hub member 252 may be stationary with respect to the ring gear 224 and the wheel housing 226.

Figure 5:
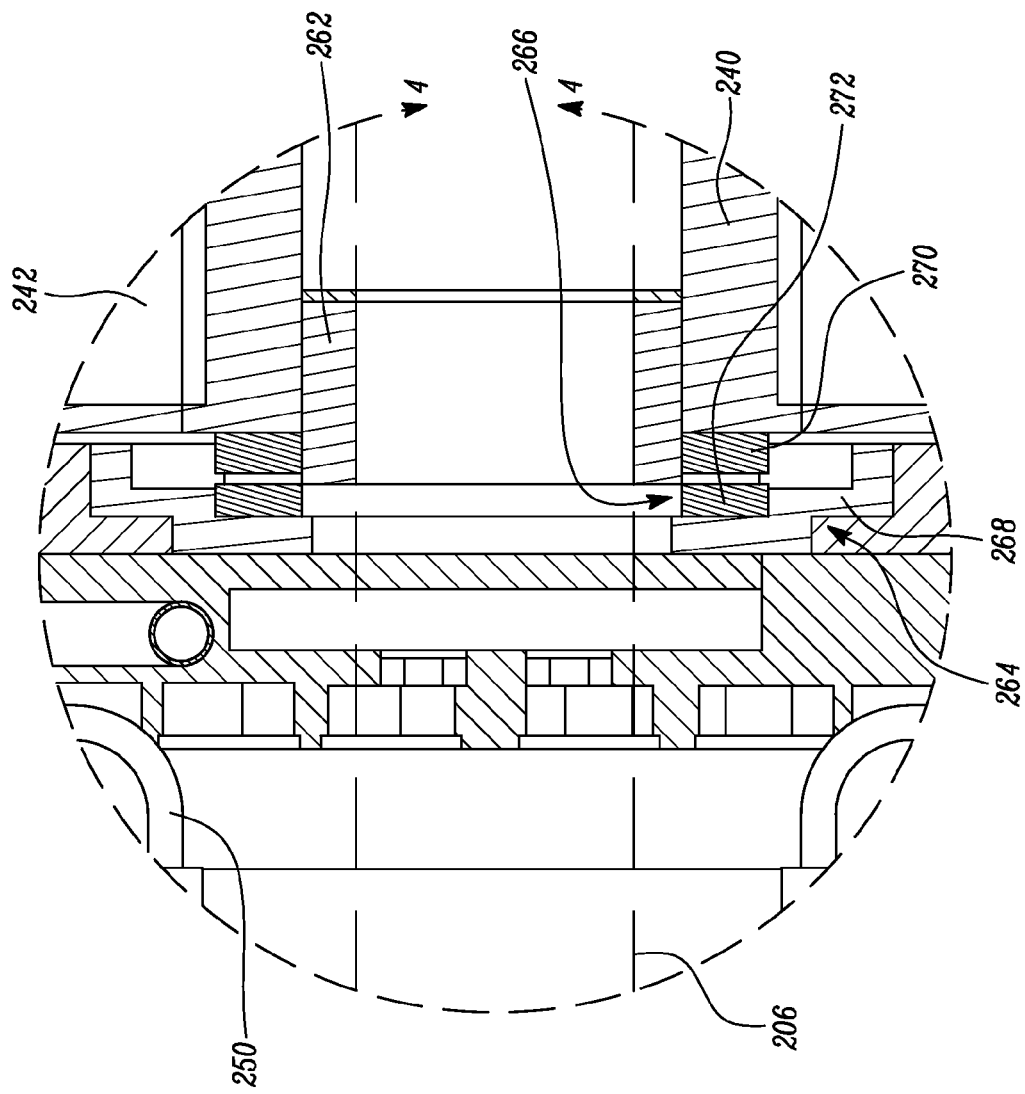
FIG. 5 is an enlarged view of the encircled portion 5-5 of FIG. 2.

Referring to FIGS. 2 and 5, the final drive assembly 200 includes a sleeve 262. The sleeve 262 is received at least partly within the second sun gear 240. The final drive assembly 200 further includes the second bearing assembly 264. In the illustrated embodiment, the second bearing assembly 264 is an inboard bearing assembly. The second bearing assembly 264 includes a second bearing 266 and a thrust plate 268. The second bearing 266 includes an outboard race 270 which receives the sleeve 262 and an inboard race 272 which receives the thrust plate 268. The second bearing 266 is configured to absorb axial loads from the second sun gear 240. Further, the second bearing assembly 264 is configured to rotatably support the second sun gear 240.

As the input shaft 206 rotates, power is transmitted to the first stage gear assembly 210. The first stage gear assembly 210 drives the second stage gear assembly 238. Power from the second stage gear assembly 238 is transferred to the ring gear 224, which further transfers the power to the wheel housing 226.

INDUSTRIAL APPLICABILITY

The present invention relates to the final drive assembly 200 including the input shaft 206, the first stage gear assembly 210, the second stage gear assembly 238, the ring gear 224 and the cover 254 disposed at the outboard end 202. The ring gear 224 is driven by the first and second stage gear assemblies 210 and 238, and in turn, transfers power to the wheel housing 226. Further, the first and second stage gear assemblies 210, 238 are disposed between the first bearing assembly 222 and the second bearing assembly 264. The first bearing assembly 222 rotatably supports the first carrier 216 of the first stage gear assembly 210, while the second bearing assembly 264 rotatably supports the second sun gear 240 of the second stage gear assembly 238. The final drive assembly 200 further includes the spring member 274 disposed between the first bearing assembly 222 and the cover 254. In the illustrated embodiment, the spring members 274 are adjacent to the first bearing assembly 222. However, in another embodiment, one or more set of spring members (not shown) may be disposed adjacent to the second bearing assembly 264.

In assembled condition, the cover 254 may apply a force on the spring members 274. The spring members 274 may preload the first bearing assembly 222 and the first and second stage gear assemblies 210, 238. Specifically, the spring members 274 is configured to bias the first bearing assembly 222, the first carrier 216 and the second sun gear 240 towards the second bearing assembly 264 to limit a movement of each of the first and second bearing assemblies 222, 264 along the longitudinal axis 208. During operation, the spring members 274 may resist the movements of the first and second bearing assemblies 222, 264 along the longitudinal axis 208 by applying an axial load on the first bearing assembly 222. A path of the axial load is indicated by arrows "A" in FIG. 2. As shown in FIG. 3, the first bearing assembly 222 may transmit the axial load to the first carrier 216. The axial load may be then transmitted from the first carrier 216 to the second sun gear 240, and hence to the second bearing 266 and the thrust plate 268. The axial load is transmitted from the thrust plate 268 to the second carrier 244 and the hub member 252. The hub member 252 in turn transmits the axial load to the wheel bearing 227, the wheel housing 226 and the ring gear 224. Thus, the transmission of the axial load may constrain the first and second stage gear assemblies 210, 238 along the longitudinal axis 208. This may reduce or prevent any tilting misalignment of various components of the first and second stage gear assemblies 210, 238 with respect to the longitudinal axis 208, thereby reducing damage and increasing an operational life of the various components.

In the illustrated embodiment, the ring gear 224 is the output of the final drive assembly 200. However, in various alternate embodiments, any other component of the final drive assembly 200 may be the output, for example, the second carrier 244.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A final drive assembly for a machine, the final drive assembly having an outboard end, the final drive assembly comprising:
   an input shaft drivably coupled to a prime mover of the machine, the input shaft defining a longitudinal axis therethrough;
   a first stage gear assembly driven by the input shaft, the first stage gear assembly comprising:
      a first sun gear coupled to and driven by the input shaft;
      a plurality of first planet gears drivably engaged with the first sun gear;
      a first carrier rotatably coupled to each of the plurality of first planet gears, the first carrier disposed adjacent to the outboard end of the final drive assembly; and
   a second stage gear assembly driven by the first stage gear assembly, the second stage gear assembly comprising:
      a second sun gear coupled to and driven by the first carrier of the first stage gear assembly;
      a plurality of second planet gears drivably engaged with the second sun gear; and
      a second carrier coupled to each of the plurality of second planet gears, the second carrier being further coupled with a hub member;
   a ring gear drivably engaged with each of the plurality of first planet gears and each of the plurality of second planet gears, the ring gear being coupled to a wheel of the machine;
   a cover coupled to the ring gear, the cover disposed at the outboard end of the final drive assembly;
   a first bearing assembly disposed adjacent to the first carrier, wherein the first bearing assembly is configured to rotatably support the first carrier;
   a spring member disposed between the first bearing assembly and the cover;
   a sleeve received at least partly within the second sun gear; and
   a second bearing assembly disposed adjacent to the sleeve, wherein the second bearing assembly is configured to rotatably support the second sun gear;
   wherein the spring member is configured to bias the first bearing assembly, the first carrier and the second sun gear towards the second bearing assembly to limit a movement of each of the first stage gear assembly and the second stage gear assembly along the longitudinal axis.

* * * * *